(12) United States Patent
Gage et al.

(10) Patent No.: US 9,765,968 B2
(45) Date of Patent: Sep. 19, 2017

(54) COMBUSTORS WITH COMPLEX SHAPED EFFUSION HOLES

(71) Applicant: HONEYWELL INTERNATIONAL INC., Morristown, NJ (US)

(72) Inventors: Raymond Gage, Phoenix, AZ (US); Nagaraja S. Rudrapatna, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1492 days.

(21) Appl. No.: 13/747,938

(22) Filed: Jan. 23, 2013

(65) Prior Publication Data

US 2014/0338347 A1  Nov. 20, 2014

(51) Int. Cl.
F23R 3/00 (2006.01)
F23R 3/06 (2006.01)
F23R 3/16 (2006.01)
F23R 3/50 (2006.01)

(52) U.S. Cl.
CPC .............. F23R 3/002 (2013.01); F23R 3/06 (2013.01); F23R 3/16 (2013.01); F23R 3/50 (2013.01); F23R 2900/00018 (2013.01); F23R 2900/03041 (2013.01); F23R 2900/03042 (2013.01); Y02T 50/675 (2013.01); Y10T 29/49231 (2015.01)

(58) Field of Classification Search
CPC .............. F23R 3/06; F23R 2900/03041; F23R 2900/03042; F23R 2900/03044; F23R 3/04; F05D 2260/202; F05D 2260/203; F01D 9/065; F01D 9/023
See application file for complete search history.

(56) References Cited

U.S. PATENT DOCUMENTS

| 6,627,019 | B2* | 9/2003 | Jarmon | C04B 35/806 |
| | | | | 156/155 |
| 7,000,397 | B2 | 2/2006 | Pidcock et al. | |
| 7,997,865 | B1 | 8/2011 | Liang | |
| 7,997,868 | B1 | 8/2011 | Liang | |
| 8,057,181 | B1 | 11/2011 | Liang | |

(Continued)

FOREIGN PATENT DOCUMENTS

| EP | 1635119 A3 | 6/2009 |
| EP | 2455665 A2 | 5/2012 |
| EP | 2423599 A3 | 7/2013 |

OTHER PUBLICATIONS

EP Examination for EP 14150504.0-1602 dated Apr. 13, 2015.

(Continued)

*Primary Examiner* — Gerald L Sung
*Assistant Examiner* — Stefan Ibroni
(74) *Attorney, Agent, or Firm* — Lorenz & Kopf, LLP

(57) ABSTRACT

A combustor is provided for a turbine engine. The combustor includes a first liner having a first side and a second side and a second liner having a first side and a second side. The second side of the second liner forms a combustion chamber with the second side of the first liner, and the combustion chamber is configured to receive an air-fuel mixture for combustion therein. The first liner defines a plurality of effusion cooling holes configured to form a film of cooling air on the second side of the first liner. The plurality of effusion cooling holes including a first effusion cooling hole extending from the first side to the second side with a non-linear line of sight.

13 Claims, 11 Drawing Sheets

(56) References Cited

U.S. PATENT DOCUMENTS

| | | |
|---|---|---|
| 8,079,812 B2 | 12/2011 | Okita |
| 8,092,176 B2 | 1/2012 | Liang |
| 2002/0076541 A1 | 6/2002 | Jarmon et al. |
| 2010/0119377 A1 | 5/2010 | Tibbott et al. |
| 2011/0302924 A1 | 12/2011 | Lee et al. |
| 2012/0047908 A1* | 3/2012 | Poyyapakkam ........ F23R 3/002 60/774 |
| 2013/0209234 A1* | 8/2013 | Xu ........................... F23R 3/06 415/116 |

OTHER PUBLICATIONS

EP Search Report for application No. 14150504.0 dated Mar. 21, 2014.

EP Exam Report for application No. 14150504.0 dated Apr. 30, 2014.

\* cited by examiner

COMBUSTORS WITH COMPLEX SHAPED EFFUSION HOLES

TECHNICAL FIELD

The following discussion generally relates to gas turbine engine combustors, and more particularly, to combustors with complex shaped effusion holes.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section for energy extraction. The combustor typically includes radially spaced apart inner and outer liners. The inner and outer liners generally define an annular combustion chamber between the compressor and the turbine.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the combustor components, such as the combustor liners, to prevent or reduce adverse impact and extend useful life. Mechanisms for cooling combustor components include effusion cooling techniques. However, given the high temperature of engine operation, cooling remains a challenge.

Accordingly, it is desirable to provide combustors with improved cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor is provided for a turbine engine. The combustor includes a first liner having a first side and a second side and a second liner having a first side and a second side. The second side of the second liner forms a combustion chamber with the second side of the first liner, and the combustion chamber is configured to receive an air-fuel mixture for combustion therein. The first liner defines a plurality of effusion cooling holes configured to form a film of cooling air on the second side of the first liner. The plurality of effusion cooling holes including a first effusion cooling hole extending from the first side to the second side with a non-linear line of sight.

In accordance with another exemplary embodiment, a combustor for a turbine engine is provided. The combustor includes a first liner having a first side and a second side and a second liner having a first side and a second side. The second side of the second liner forms a combustion chamber with the second side of the first liner, and the combustion chamber is configured to receive an air-fuel mixture for combustion therein. The first liner defines a plurality of effusion cooling holes configured to form a film of cooling air on the second side of the first liner. The plurality of effusion cooling holes including a first effusion cooling hole having an inlet on the first side, a first outlet on the second side and fluidly coupled to the inlet, and a second outlet on the second side and fluidly coupled to the inlet.

In accordance with a further exemplary embodiment, a method is provided for forming a combustor component. The method includes generating a three-dimensional model of the combustor component and forming the combustor component according to the three-dimensional model with additive manufacturing.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments described herein provide a combustor having single-walled or dual-walled liners with effusion and/or impingement cooling holes having complex shapes. For example, the effusion cooling holes may have a non-linear line of sight arrangement. As an additional example, the effusion cooling holes may be at least partially formed by a tube portion extending outward from the cold and/or hot side of the combustion liner. Moreover, effusion cooling holes may have multiple outlets. Such effusion cooling holes may be formed by additive manufacturing techniques.

Figure 1:
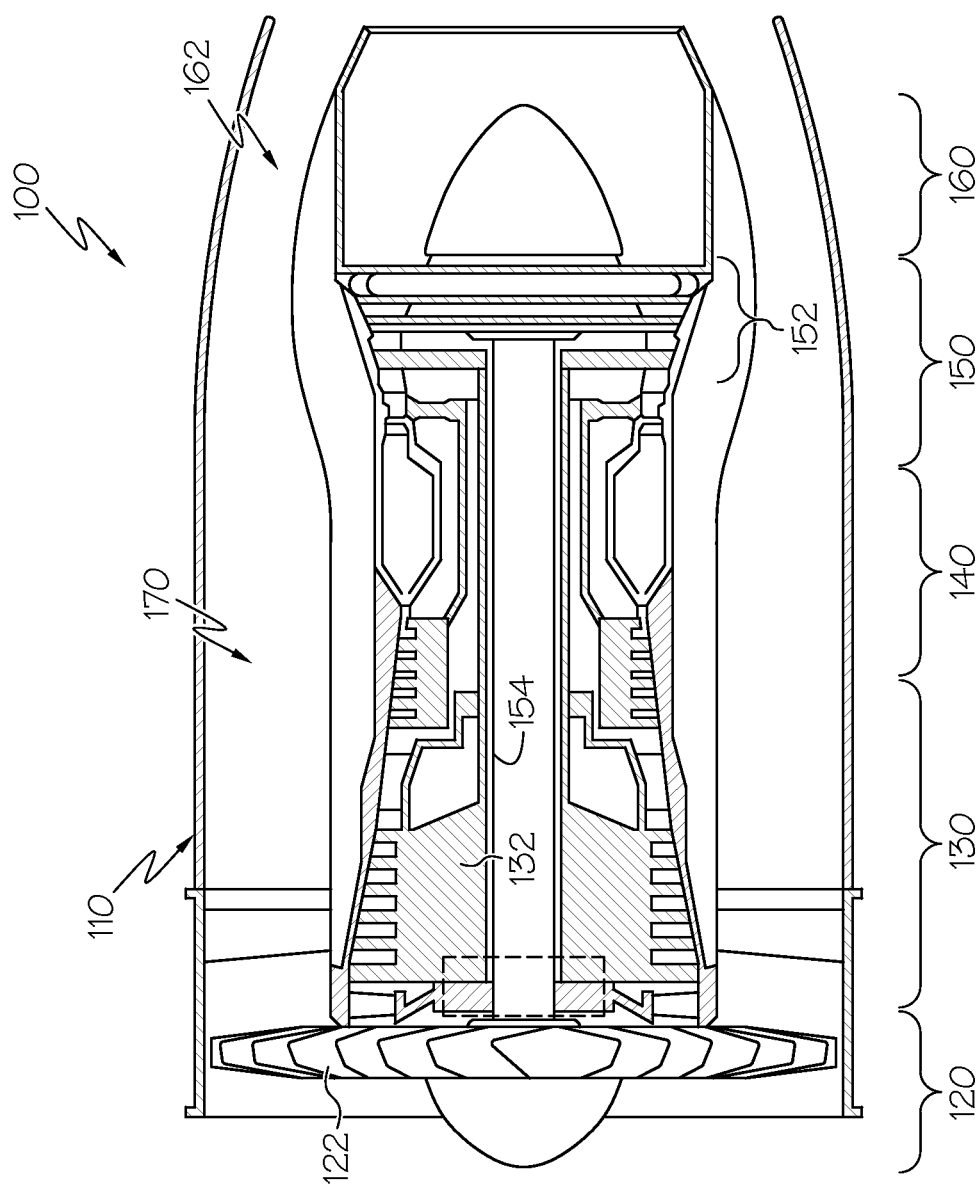
FIG. 1 is a cross-sectional view of a gas turbine engine in accordance with an exemplary embodiment.

FIG. 1 is a simplified, cross-sectional view of a gas turbine engine 100 according to an embodiment. The engine 100 may be disposed in an engine case 110 and may include a fan section 120, a compressor section 130, a combustor section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132 that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through a propulsion nozzle 162 disposed in the exhaust section 160. In one embodiment, the turbines 152 rotate to drive equipment in the engine 100 via concentrically disposed shafts or spools. Specifically, the turbines 152 may drive the compressors 132 via one or more rotors 154. FIG. 1 depicts one exemplary configuration. Other embodiments may have alternate arrangements, such as to provide mechanical power or compressed air instead of thrust.

Figure 2:
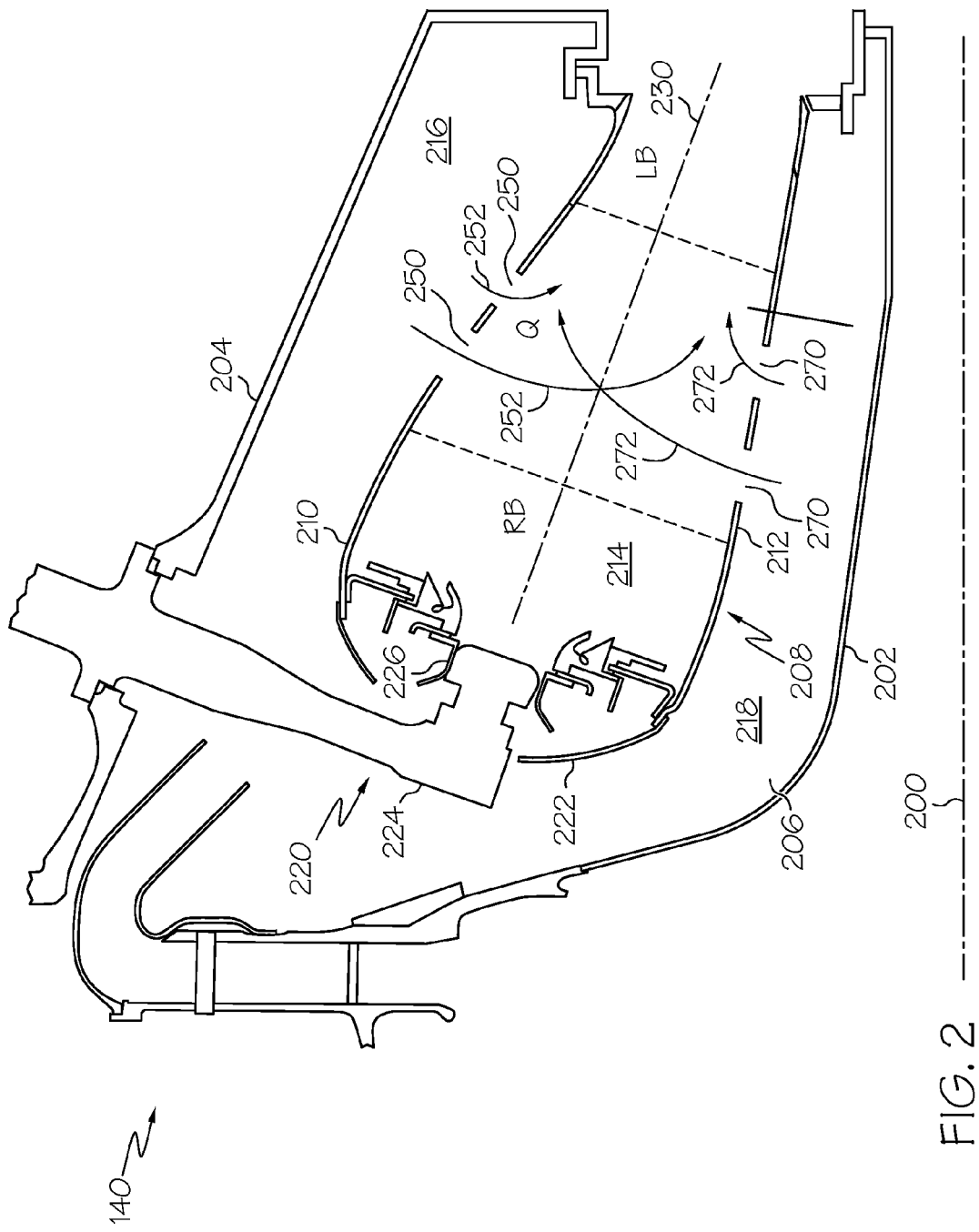
FIG. 2 is a partial, cross-sectional side elevation view of a combustor section of the engine of FIG. 1 in accordance with an exemplary embodiment.

FIG. 2 is a more detailed cross-sectional view of the combustor section 140 of FIG. 1. In FIG. 2, only half the cross-sectional view is shown; the other half would be substantially rotationally symmetric about a centerline and axis of rotation 200. The combustor section 140 of FIG. 2 is an annular combustor section 140, although aspects of exemplary embodiments described herein may also be useful in can combustors, can-annular combustors, and other types of combustors. Moreover, exemplary embodiments may find beneficial uses in many industries, including aerospace and particularly in high performance aircraft, as well as automotive, marine and power generation.

The combustor section 140 includes a radially inner case 202 and a radially outer case 204 concentrically arranged with respect to the inner case 202. The inner and outer cases 202, 204 circumscribe the axially extending engine centerline 200 to define an annular pressure vessel 206. The combustor section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of fuel injectors 224. Each fuel injector 224 introduces a swirling, intimately blended fuel-air mixture that supports combustion in the combustion chamber 214.

The depicted combustor 208 is a rich burn, quick quench, lean burn (RQL) combustor, although further exemplary embodiments may include other types of combustors. During operation, a portion of the pressurized air enters a rich burn zone RB of the combustion chamber 214 by way of passages in the front end assembly 220. This air is referred to as primary combustion air because it intermixes with a stoichiometrically excessive quantity of fuel introduced through the fuel injectors 224 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. Jets 252 flow from the plenum 216 into the quench zone Q through air admission (or quench) holes 250 in the outer liner 210. Similarly, jets flow from the plenum 218 into the quench zone Q through air admission (or quench) holes 270 in the inner liner 212. Additional holes with similar features and arrangements may be provided in both the outer and inner liners 210, 212 to provide additional quench jets to the combustion chamber 214.

The quench air jets 252 272 rapidly mix the combustion products from a stoichiometrically rich state at the forward edge of the quench zone Q to a stoichiometrically lean state at, or immediately downstream of, the aft edge of the quench zone Q to support further combustion and release additional energy from the fuel in order to avoid excessive NOx generation. Finally, the combustion products from the quench zone Q enter a lean burn zone LB where the combustion process concludes.

As noted above, the engine components are subject to extremely high temperatures resulting from high velocity hot gases ducted from the combustor section 140 (FIG. 2). If unaddressed, the extreme heat may affect the useful life of the component and/or impact the maximum operating temperature of the engine. As such, cooling techniques and/or mechanism may be provided to maintain temperature at an acceptable level. Such cooling may include effusion cooling techniques, as described in greater detail below.

Figure 3:
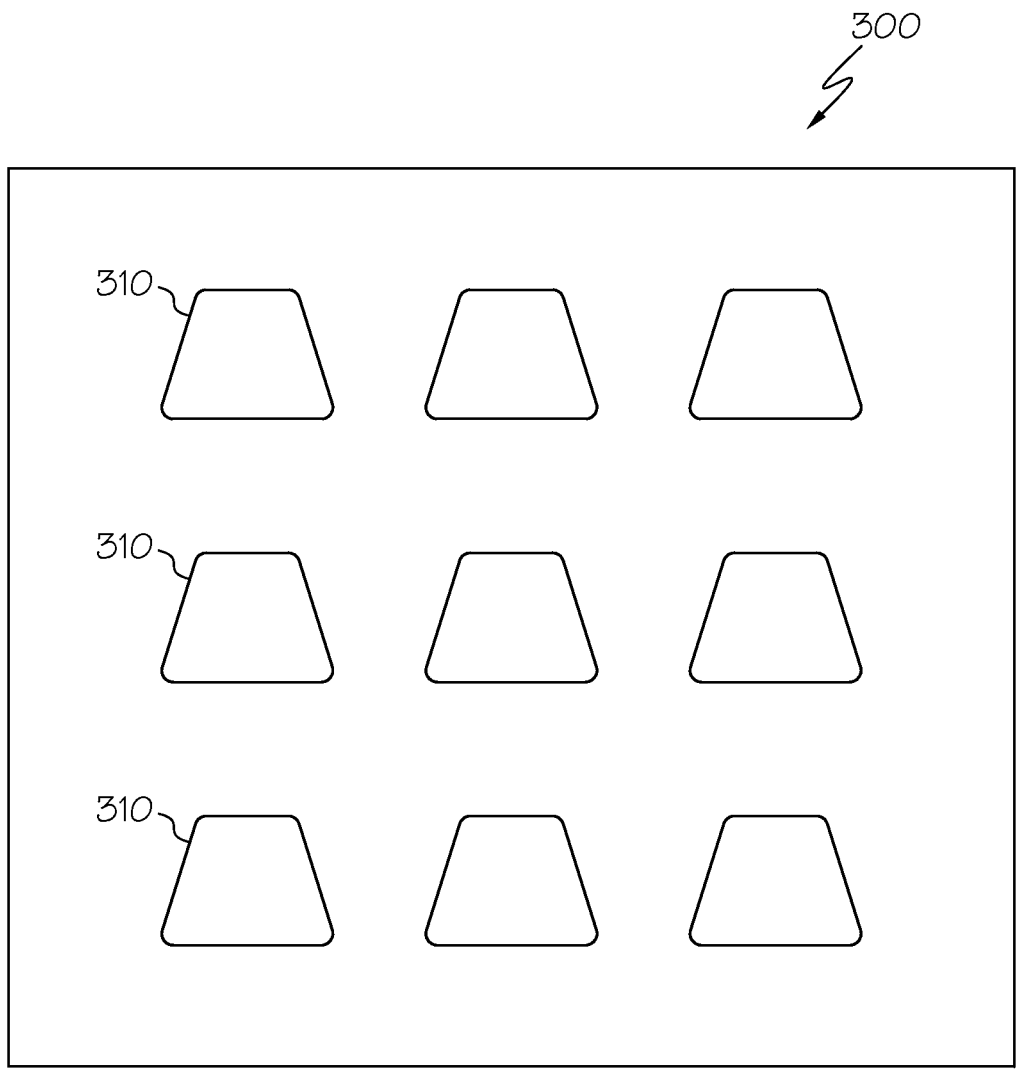
FIG. 3 is a partial outer plan view of a liner of the combustor section of FIG. 2 in accordance with an exemplary embodiment.
Figure 4:
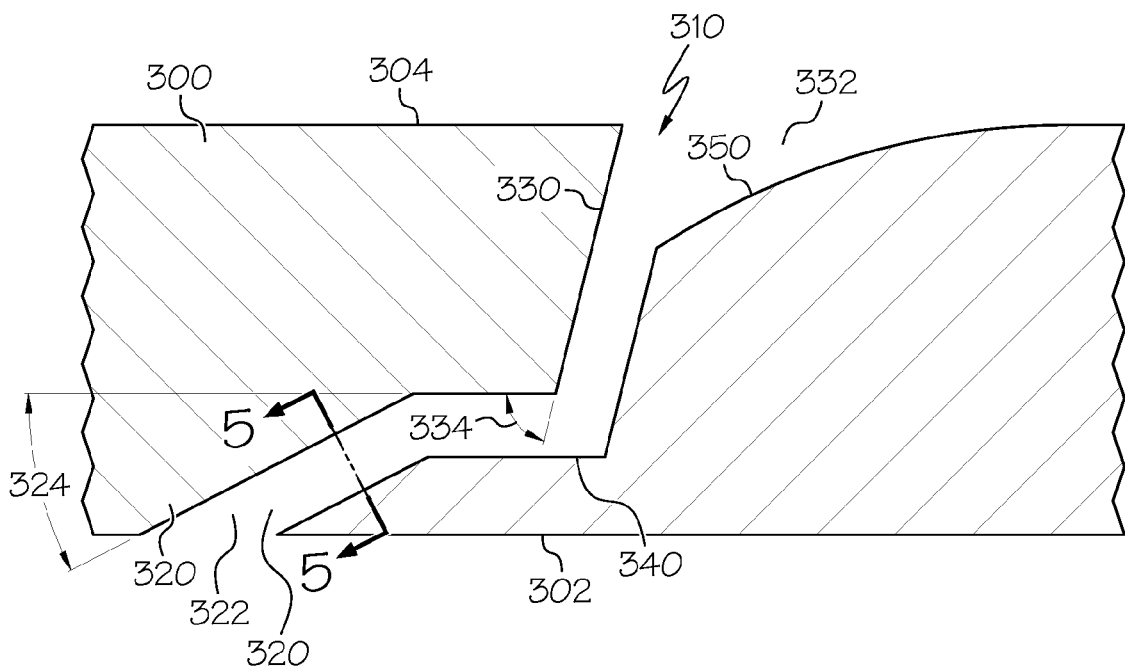
FIG. 4 is a cross-sectional view of an effusion cooling hole of the liner of FIG. 3 in accordance with an exemplary embodiment.
Figure 5:
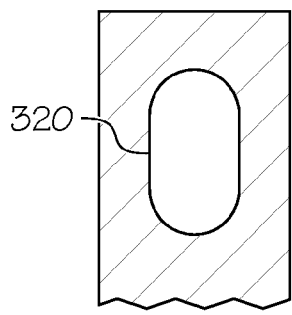
FIG. 5 is a cross-sectional view of a portion of the effusion cooling hole of FIG. 4 through line 5-5 in accordance with an exemplary embodiment.

FIG. 3 is a partial outer plan view of a liner 300 of a combustor, such as the combustor 208 of FIG. 2, in accordance with an exemplary embodiment. As an example, the liner 300 may represent any portion of the outer or inner liner 210, 212 of the combustor 208 of FIG. 2. As shown, the liner 300 may include a number of effusion cooling holes 310. Additional details about the effusion cooling holes 310 will be provided with reference to FIGS. 4 and 5. FIG. 4 is a cross-sectional view of an effusion cooling hole 310 of the liner 300 of FIG. 3 in accordance with an exemplary embodiment, and FIG. 5 is a cross-sectional view of the effusion cooling hole 310 of FIG. 4 through line 5-5 in accordance with an exemplary embodiment. FIGS. 3-5 will be discussed together.

In general, the effusion cooling holes 310 are relatively small, closely spaced holes serving to direct a flow of cooling air through the liner 300. The effusion cooling holes 310 are typically angled at, for example, 0°-45° to the surface of the liner 300, and may be oriented to discharge at various angles relative to the bulk combustor gas flow, such that a film of cooling air forms on the inner surface of the liner 300, e.g., the surface facing the combustion chamber. As an example, an effusion cooling hole 310 with an angle of 0° may be considered tangent to the downstream surface.

As such, in the depicted exemplary embodiment of FIG. 4, the effusion cooling hole 310 extends from a first (or cold) side 302 of the liner 300, through the liner 300, to a second (or hot) side 304 of the liner 300. Accordingly, the effusion cooling hole 310 may be considered to have an upstream portion 320 with an inlet 322, an intermediate portion 340, and a downstream portion 330 with an outlet 332. The portions 320, 330, 340, including the inlet 322 and outlet 332, may have any suitable configuration or shape. Moreover, additional portions or segments may be provided as necessary or desired.

In this exemplary embodiment, the upstream portion 320 is generally straight at a first angle 324 relative to the first side 302 of the liner 300. The upstream portion 320 has an oval cross-sectional shape, as best shown by FIG. 5. In general, however, the upstream portion 320 may have any suitable shape, including circular or non-regular. The inlet 322 may have any suitable inlet angle, including for example 5° or less.

The intermediate portion 340 extends within the interior of the liner 300 between the upstream portion 320 and the downstream portion 330. In this exemplary embodiment, the intermediate portion 340 extends parallel to the cold and hot sides (or surfaces) 302, 304. Although the intermediate portion 340 is depicted as straight in the embodiment of FIG. 4, in other embodiments, the intermediate portion 340 may be also be parallel to the surfaces that are curved, e.g., the intermediate portion 340 may match the curvature of the liner 300. The intermediate portion 340 may have any suitable configuration and shape.

Similarly, the downstream portion 330 is generally straight at a second angle 334. The second angle 334 may be different than the first angle 324. Additionally, the downstream portion 330 of each cooling hole 310 is at least partially defined by or otherwise fluidly coupled to a trench 350. In general, the trench 350 includes a base surface that transitions from the downstream portion 300 to the outlet 332. The trench 350 is configured to provide improved film cooling at the surface of the liner 300 by providing a relatively small exit angle. The trench 350 enables the cooling air to remain attached to the liner 300 for a longer period of time and minimizes mixing of the cooling air and mainstream gas flow, thereby resulting in a more effective film. Relative to conventional arrangements, the trench 350 reduces the radial velocity (i.e., perpendicular to the surface 304) of the cooling air as it exits the cooling hole 310 to prevent surface separation. Typically, each cooling hole 310 is associated with a single trench 350, e.g., each trench 350 is only in fluid communication with a single hole and not other cooling holes or trenches. In general, the trench 350 is arranged at the exit of the cooling hole 220 and is typically very close to the outer surface 304 of the liner 300. The trench 350 may have any suitable shape or configuration, including a predetermined length, width, and depth. In the depicted exemplary embodiment, the trench 350 is convex, although the trench may also be straight, concave, or portions with various shapes.

The trench 350 transitions into the outlet 332, as best shown in the plan view of FIG. 3. In the depicted exemplary embodiment, the outlet 332 has a shape of truncated pyramid with rounded edges or a "fan" shape. However, any suitable shape may be provided, including bean shapes, triad shapes, dumbbell shapes, triangular shapes, oval shapes, and/or non-regular shapes.

As particularly shown in FIG. 4, the effusion cooling hole 310 may be considered to have a non-linear line of sight. In other words, there is no virtual, single straight line segment that may be extended between the inlet 322 and outlet 332, given the areas of the inlet 322 and outlet 332, and the diameters, shapes, and angles of the respective portions 320, 330. The inlet 322 is may be offset or non-parallel to the outlet 332. Additional details about forming the effusion cooling hole 310 are provided below. Moreover, other types of cooling holes may be provides, as will now be described.

Figure 6:
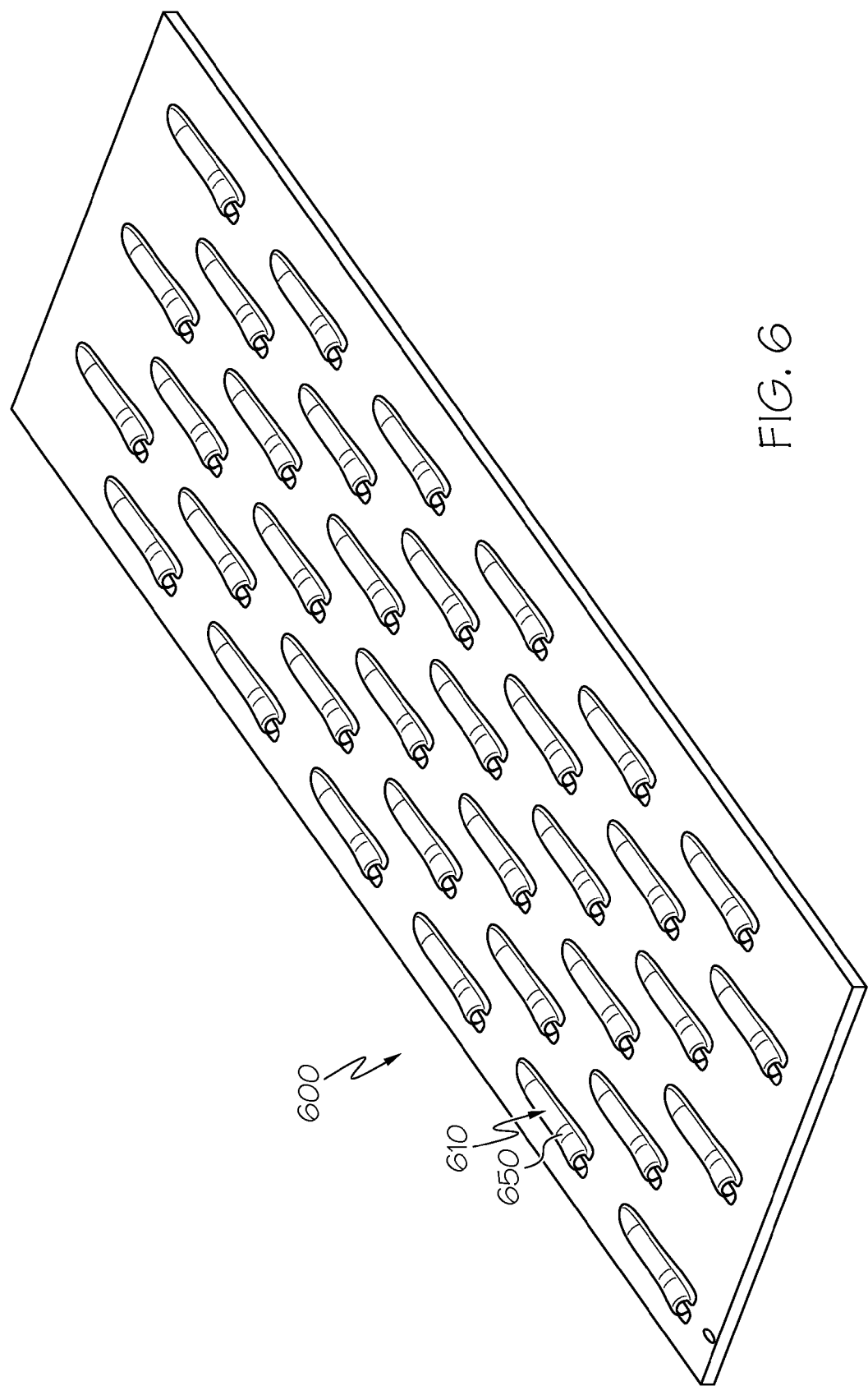
FIG. 6 is a partial outer isometric view of a liner of the combustor section of FIG. 2 in accordance with an alternate exemplary embodiment.
Figure 7:
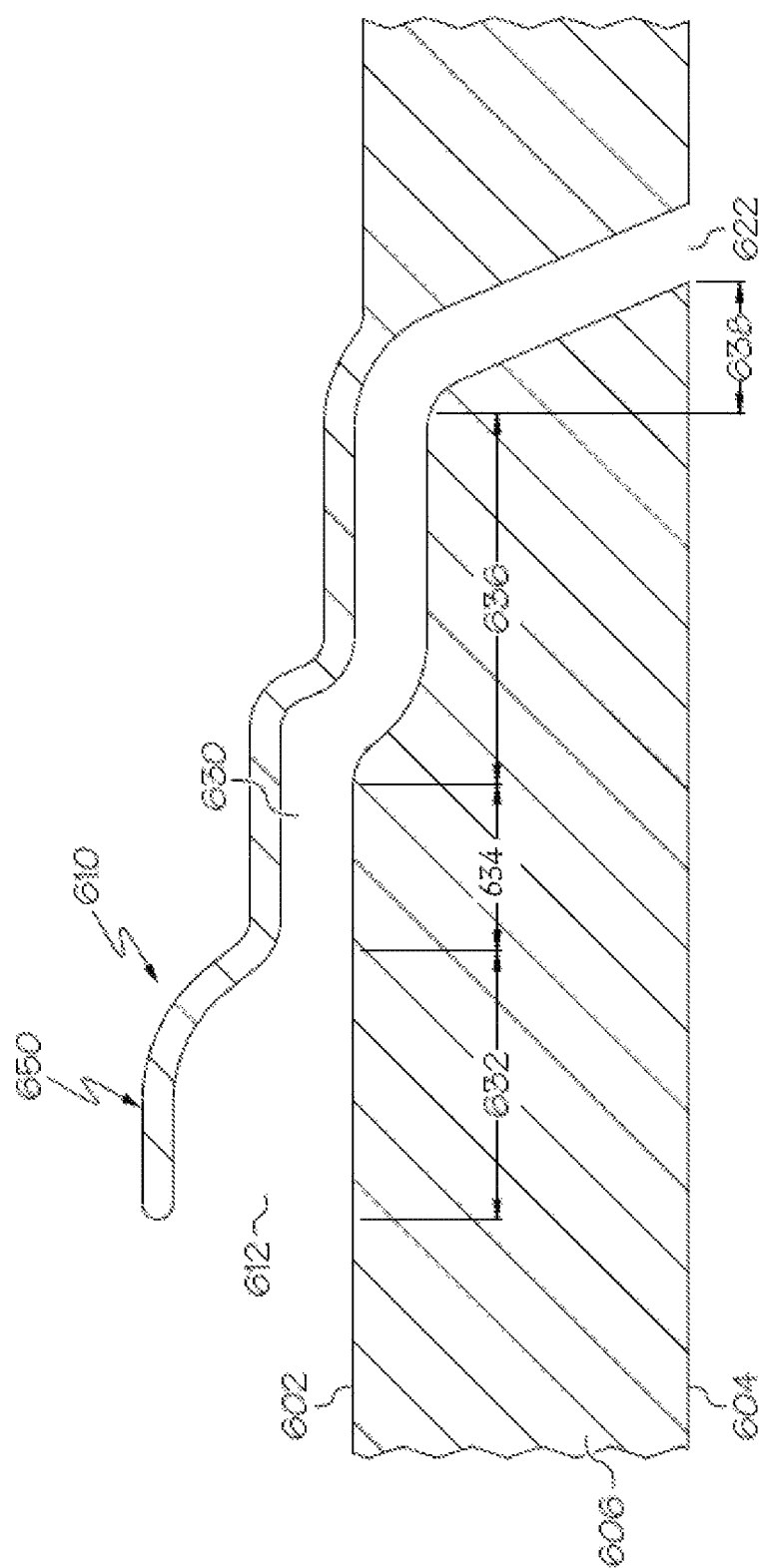
FIG. 7 is a cross-sectional view of an effusion cooling hole of the liner of FIG. 6 in accordance with the alternate exemplary embodiment.

A further exemplary embodiment of effusion cooling holes 610 is depicted by FIGS. 6 and 7. Such effusion cooling holes 610 may be incorporated into a combustor, such as the combustor 208 of FIG. 2. Each effusion cooling hole 610 may include an inlet 612 on a cold side 602, an outlet 622 on a hot side 604, and a main (or tube) portion 630 extending between the inlet 612 and outlet 622. The tube portion 630 may include a number of segments 632, 634, 636, 638. As described in greater detail below, the tube portion 630 is generally formed by an outer structure 650 that extends or protrudes from the cold side 602 of the liner 600. In particular, the outer structure 650 extends radially outward from the cold side 602, e.g., the outer structure 650 is not in the same plane as the cold side 602.

The first segment 632 extends from the outlet 622 to the second segment 634. In the depicted embodiment, the first segment 632 is formed by the outer structure 650 and the cold side 604 of the liner 600. As such, in this embodiment, the inlet 612 and the first segment 632 are, in effect, completely exterior to the plane defined by the cold side 602 of the liner 600. The inlet 612 is completely non-planar with the cold side 602, and in the depicted embodiment, the inlet 612 is perpendicular to the plane defined by the cold side 602.

In one exemplary embodiment, the first segment 632 may be a bell-mouth structure. In other words, the area of the first segment 632 increases towards the inlet 612. As a result of this configuration, the first segment 632 may function as a scoop to direct air into the effusion cooling hole 610.

The second segment 634 extends from the first segment 632 to the third segment 636. In the depicted embodiment, the second segment 634 is formed by the outer structure 650 and the cold side 604 of the liner 600. As such, in this embodiment, the inlet 612 and the second segment 634 are, in effect, completely exterior to the plane defined by the cold side 602 of the liner 600. In this embodiment, the second segment 634 has a generally constant area along the length of the second segment 634.

The third segment 636 extends from the second segment 634 to the fourth segment 638. In the depicted embodiment, the third segment 636 is formed by the outer structure 650 and an interior portion 606 of the liner 600. In this description, the interior portion 606 of the liner 600 corresponds to the liner portion between the plane formed by the hot side 602 and the plane formed by the cold side 604. In this embodiment, the third segment 636 has a generally constant area along the length of the third segment 636.

The fourth segment 638 extends from the third segment 636 to the outlet 622. In the depicted embodiment, the fourth segment 638 is formed completely within the interior portion 606 of the liner 600. In this embodiment, the fourth segment 638 has a generally constant area along the length of the fourth segment 638, although the area may also be varied. Although not shown, the outlet 622 may have a protruding or scoop structure similar to the structure 650 as necessary or desired for advantageous cooling flow placement.

As a result of this arrangement, the effusion cooling hole 650 has a relatively long length-to-diameter ratio. The length-to-diameter ratio may be for example, between 2-50. In other embodiments, the length-to-diameter ratio may be, for example between 10-50 or between 25-50. Such a ratio may enhance cooling in a number of ways. For example, the extended length enables placement of cooling air in areas that may have otherwise been difficult to reach. Additionally, the extended length may enable enhanced conduction cooling of the liners.

Although the tube portion 630 has been described with respect to four segments 632, 634, 636, 638, one of more of the segments 632, 634, 636, 638 may be omitted and/or modified. One of more of the segments 632, 634, 636, 638 may function as a metering segment to provide the desired amount of cooling air through the effusion cooling hole 610. Additionally, one or more additional segments may be added to provide any suitable configuration or arrangement.

As above, the effusion cooling hole 610 may be considered to have a non-linear line of sight. In other words, there is no virtual straight line that may be extended between the inlet 612 and outlet 622, given the areas of the inlet 612 and outlet 622, and the diameters, shapes, and angles of the respective segments 632, 634, 636, 638.

Figure 8:
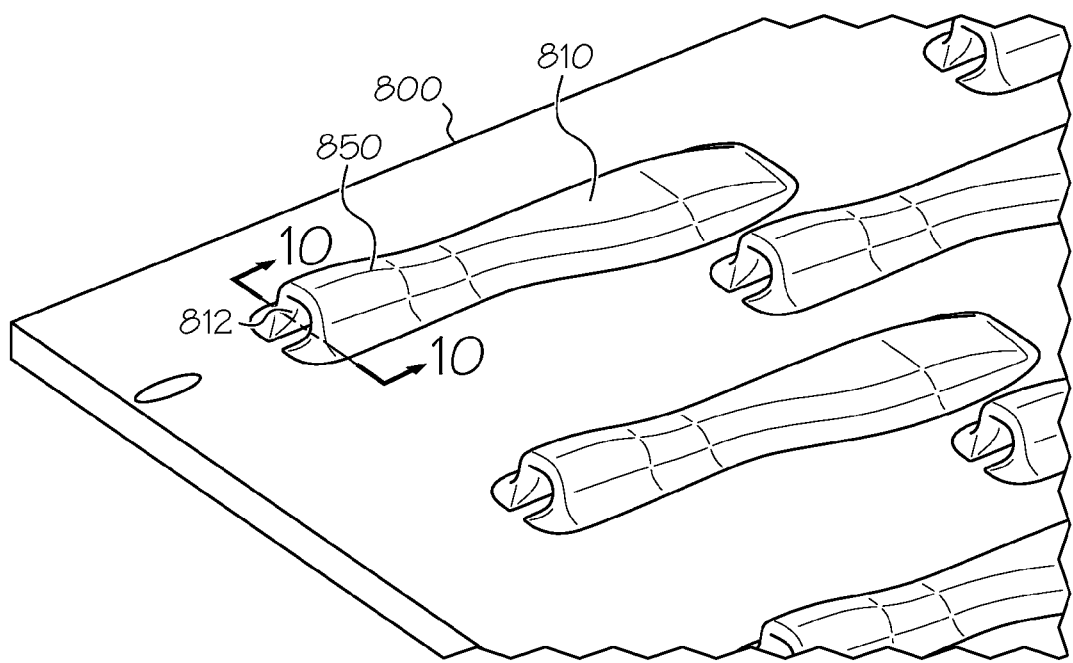
FIG. 8 is a partial outer isometric view of a liner of the combustor section of FIG. 2 in accordance with an alternate exemplary embodiment.
Figure 9:
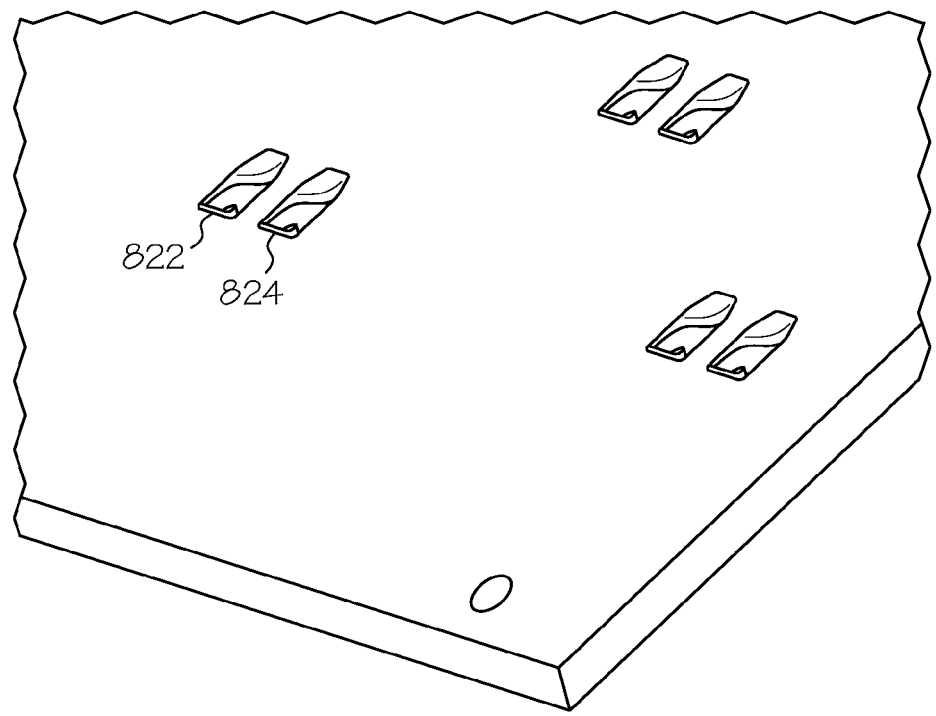
FIG. 9 is a partial inner isometric view of the liner of FIG. 8 in accordance with the alternate exemplary embodiment.
Figure 10:
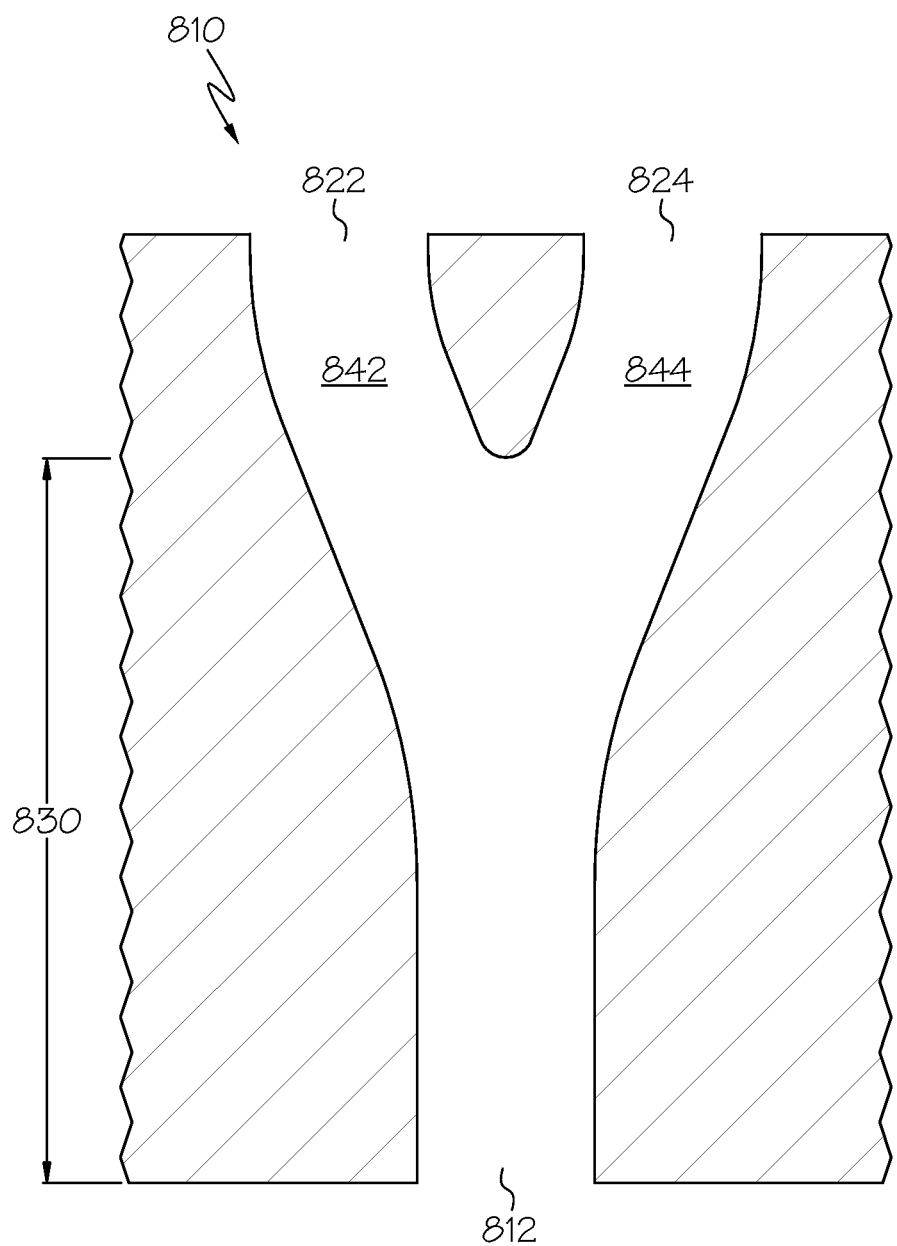
FIG. 10 is a cross-sectional view of an effusion cooling hole through line 10-10 of FIG. 8 in accordance with the alternate exemplary embodiment.

A further exemplary embodiment of effusion cooling holes 810 is depicted by FIGS. 8-10. FIG. 8 is a partial outer isometric view of a liner 800 of the combustor section in accordance with an alternate exemplary embodiment, and FIG. 9 is a partial inner isometric view of the liner 800 of FIG. 8 in accordance with the alternate exemplary embodiment. FIG. 10 is a cross-sectional view generally through line 10-10 of FIG. 8 and generally along a longitudinal axis of the cooling hole 810.

The effusion cooling hole 810 may include an inlet 812, dual outlets 822, 824, and a main (or tube) portion 830 extending between the inlet 812 and dual outlets 822, 824. The inlet 812 is best shown in FIG. 8. The dual outlets 822, 824 are best shown by FIG. 9, and FIG. 10 shows the general shape of the effusion cooling hole 810.

As such, briefly referring particularly to FIG. 10, the effusion cooling hole 810 may include an upstream segment 830 and first and second downstream segments 842, 844. Each of the downstream segments 842, 844 are fluidly coupled to the upstream segment 830.

As in the exemplary embodiments above, at least a portion of the upstream and downstream segments 830, 842, 844 may be formed by an exterior tube portion 850 extending from the plane defined by the cold side 820 of the liner 800. Moreover, the effusion cooling hole 810 may be considered to have a non-linear line of sight. In other words, there is no virtual straight line that may be extended between the inlet 812 and outlets 822, 824, given the areas of the inlet 812 and outlets 822, 824, and the diameters, shapes, and angles of the respective segments 830, 842, 844. Although the effusion cooling hole 810 has been described with respect to three segments 830, 842, 844, one or more additional segments may be added to provide any suitable configuration or arrangement. Although not shown, the effusion cooling hole 810 may include one or more additional inlets and outlets. As such, any number of inlets and outlets may be formed within the liner in a fluidly coupled arrangement.

Figure 11:
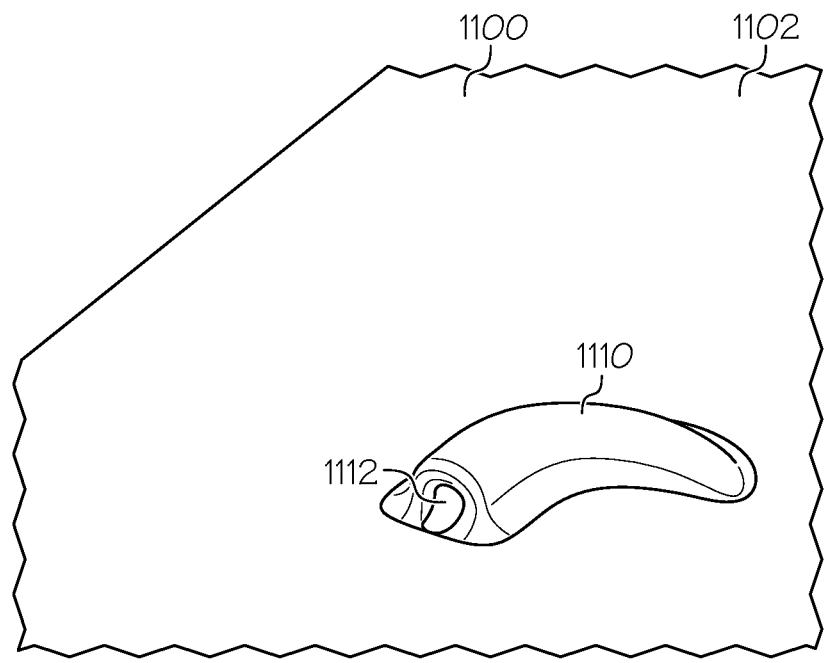
FIG. 11 is a partial outer isometric view of a liner of the combustor section of FIG. 2 in accordance with an alternate exemplary embodiment.
Figure 12:
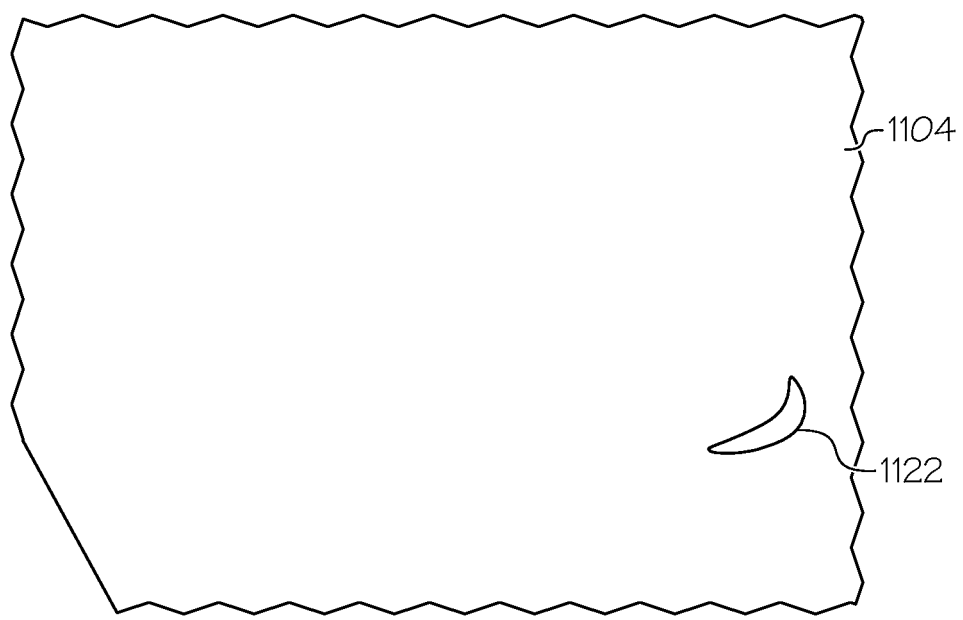
FIG. 12 is a partial inner isometric view of the liner of FIG. 11 in accordance with the alternate exemplary embodiment.

A further exemplary embodiment of effusion cooling holes 1110 is depicted by FIGS. 11 and 12. FIG. 11 is a partial outer isometric view of a liner 1100 of the combustor section in accordance with an alternate exemplary embodiment, and FIG. 12 is a partial inner isometric view of the liner 1100 of FIG. 11 in accordance with the alternate exemplary embodiment.

In the depicted exemplary embodiment, the effusion cooling hole 1110 may include an inlet 1112 on a cold side 1102, an outlet 1122 on a hot side 1104, and a main (or tube) portion 1130 extending between the inlet 1112 and outlet 1122. As in the exemplary embodiments above, at least a portion of the inlet 1112 and tube portion 1130 is formed by an exterior tube portion 1150 extending from the plane defined by the cold side 1102 of the liner 1100.

As best shown in FIG. 11, the effusion cooling hole 1110 may be considered to have a longitudinal axis that is curved relative to an axial direction and/or local streamlines in a plane corresponding to the cold side 1102. As a result of this arrangement, the effusion cooling hole 1110 enables the cooling air flow to be redirected to any desirable angle. For example, the cooling air flow through the effusion cooling hole 1110 may be redirected 90°, 180°, or 270° from to the angle at the inlet 1112 relative to the plane of the cold side 1102.

While typical effusion holes maintain a constant angle with respect to the axial-tangential surfaces that usually make up combustors, these holes 1110 may change the flow direction or voracity between the cold side 1102 and hot side 1104. These changes may be used to better match flow directions between the cold side 1102 and hot side 1104 and/or to provide a specific influence to the downstream flow. Such holes 1110 may be referred to as cambered holes that change the tangential component of the air as it passes through the hole.

Moreover, the effusion cooling hole 1110 may be considered to have a non-linear line of sight. In other words, there is no virtual straight line that may be extended between the inlet 1112 and outlet 1122, given the areas of the inlet 1112 and outlet 1122, 1124, and the diameters, shapes, and angles of the portions 1130.

In general, some embodiments of effusion cooling holes may be considered an "arbitrary" design. As an example, an arbitrary effusion cooling hole may be defined as having an: inlet section, with or without an external scoop, a first transition section, a parallel to surface section, a second transition section, and an exit section, with or without external nozzle. The area of the hole may vary arbitrarily and continuously throughout all sections, and there could be an arbitrary number of exit holes, that branch at any point along the path. The material to close the hole may protrude on either side of the combustor liner as necessary. As such, the exit holes may have an arbitrary orientation and location with respect to the inlet.

Figure 13:
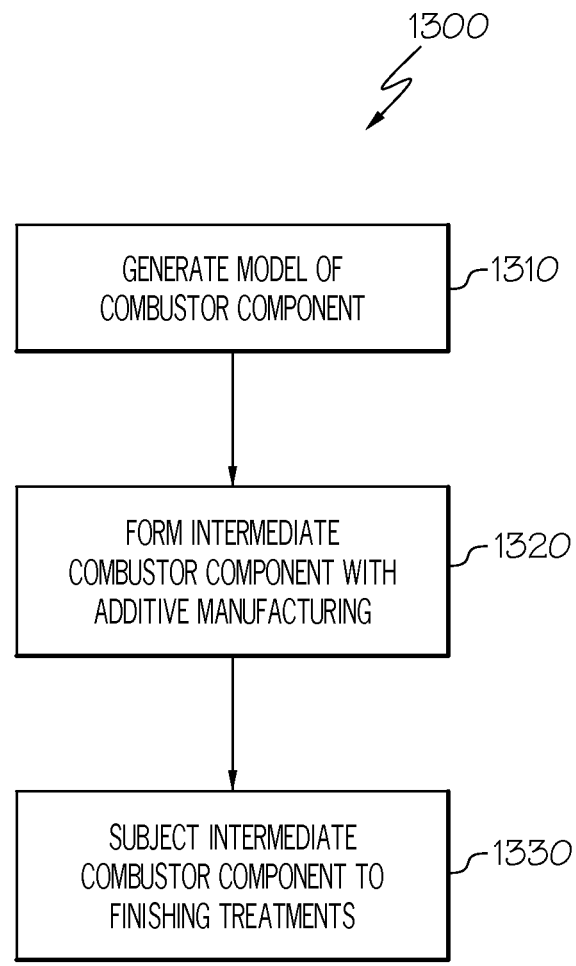
FIG. 13 is a flowchart of a method for manufacturing combustor components in accordance with an exemplary embodiment.

Given the relatively complex nature of the effusion cooling holes discussed above, it may be difficult to manufacture such holes with casting and/or EDM drilling. FIG. 13 is a flowchart of a method 1300 for manufacturing a combustor component, such as the liners with effusion cooling holes discussed above. In a first step 1310, a model, such as a design model, of the combustor component may be defined in any suitable manner. The model may be designed with computer aided design (CAD) software and include 3D numeric coordinates of the entire configuration of the combustor component including both external and internal surfaces. In one exemplary embodiment, the model may include a number of successive 2D cross-sectional slices that together form the 3D component.

In step 1320 of the method 1300, an intermediate combustor component article is formed according to the model of step 1310. The intermediate combustor component article may include the effusion cooling holes discussed above. In the discussion of method 1300, the unfinished combustor component at intermediate steps in the process, such as step 1320, may be referred to as an intermediate combustor component article (or generally, "intermediate article").

In one exemplary embodiment, the intermediate combustor component article is formed using a rapid prototyping or additive layer manufacturing process. Although additive layer manufacturing processes are described in greater detail below, in some embodiments, the component article may be forged or cast in step 1320, for example, with a single-crystal structure. In other embodiments, other manufacturing methods may be employed to fabricate the component article.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques may provide flexibility in free-form fabrication without geometric constraints, fast material processing time, and innovative joining techniques. In one particular exemplary embodiment, direct metal laser fusion (DMLF) is used to produce the first portion of step 1320. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS).

As such, in one exemplary embodiment, step 1320 is performed with DMLF techniques to form the of the intermediate combustor component article. However, prior to a discussion of the subsequent method steps, reference is made to FIG. 14, which is a schematic view of a DMLF system 1400 for manufacturing the one or more portions of the intermediate combustor component article in accordance with an exemplary embodiment.

Figure 14:
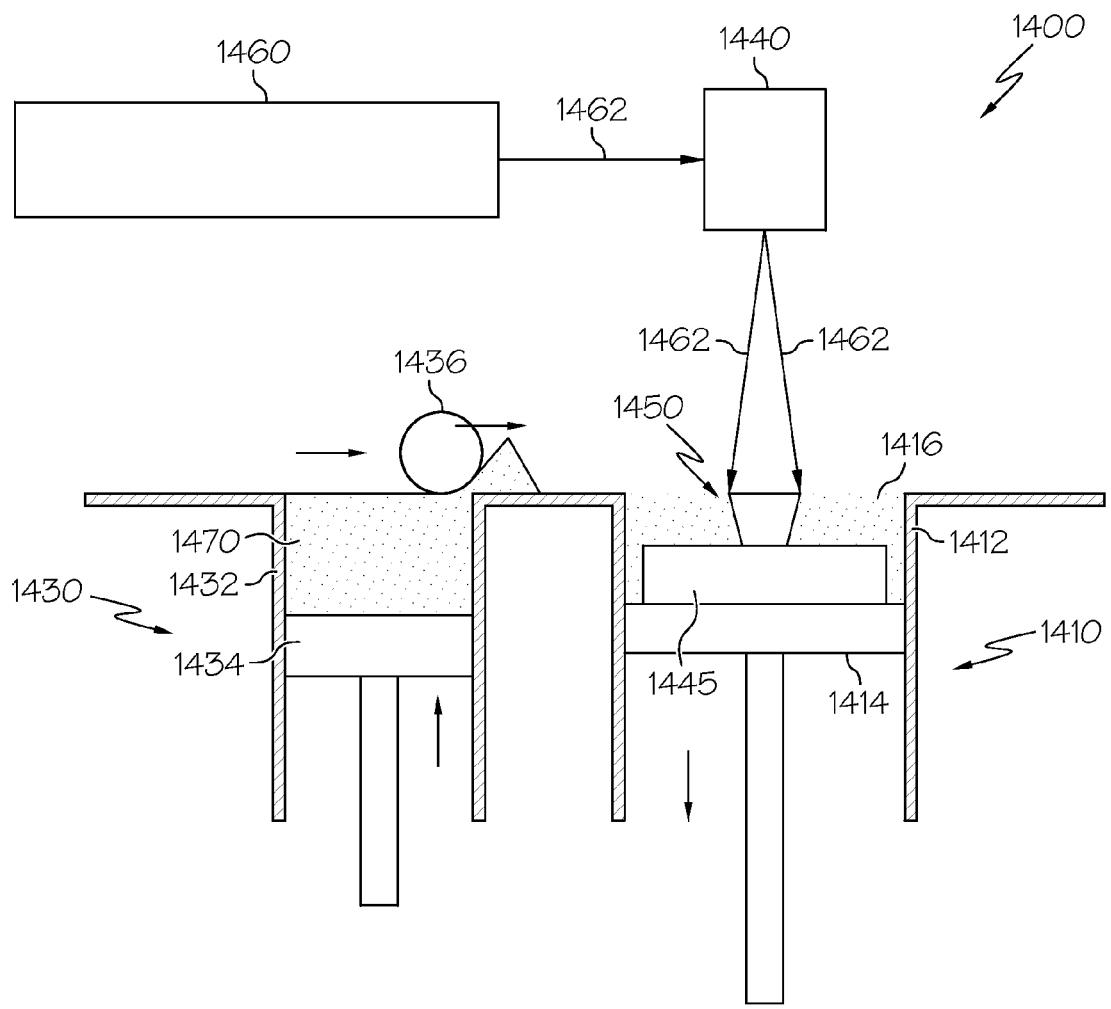
FIG. 14 is a schematic view of a system used in the method of FIG. 13 in accordance with an exemplary embodiment.

Referring to FIG. 14, the system 1400 includes a fabrication device 1410, a powder delivery device 1430, a scanner 1440, and a laser 1460 that function to manufacture the respective portion of an intermediate combustor component article 1450 with build material 1470.

The fabrication device 1410 includes a build container 1412 with a fabrication support 1414 on which the intermediate combustor component article 1450 is formed and supported. The fabrication support 1414 is movable within the build container 1412 in a vertical direction and is adjusted in such a way to define a working plane 1416. The delivery device 1430 includes a powder chamber 1432 with a delivery support 1434 that supports the build material 1470 and is also movable in the vertical direction. The delivery device 1430 further includes a roller or wiper 1436 that transfers build material 1470 from the delivery device 1430 to the fabrication device 1410.

During operation, a base block 1445 may be installed on the fabrication support 1414. The fabrication support 1414 is lowered and the delivery support 1434 is raised. The roller or wiper 1436 scrapes or otherwise pushes a portion of the build material 1470 from the delivery device 1430 to form the working plane 1416 in the fabrication device 1410. The laser 1460 emits a laser beam 1462, which is directed by the scanner 1440 onto the build material 1470 in the working plane 1416 to selectively fuse the build material 1470 into a cross-sectional layer of the intermediate combustor component article 1450 according to the design. More specifically, the speed, position, and other operating parameters of the laser beam 1462 are controlled to selectively fuse the powder of the build material 1470 into larger structures by rapidly melting the powder particles that may melt or diffuse into the solid structure below, and subsequently, cool and resolidify. As such, based on the control of the laser beam 1462, each layer of build material 1470 will include unfused and fused build material 1470 that respectively corresponds to the cross-sectional passages and walls that form the intermediate combustor component article 1450. In general, the laser beam 1462 is relatively low power to selectively fuse the individual layer of build material 1470. As an example, the laser beam 1462 may have a power of approximately 50 to 500 Watts, although any suitable power may be provided.

Upon completion of a respective layer, the fabrication support 1414 is lowered and the delivery support 1434 is raised. Typically, the fabrication support 1414, and thus the intermediate combustor component article 1450, does not move in a horizontal plane during this step. The roller or wiper 1436 again pushes a portion of the build material 1470 from the delivery device 1430 to form an additional layer of build material 1470 on the working plane 1416 of the fabrication device 1410. The laser beam 1462 is movably supported relative to the intermediate combustor component article 1450 and is again controlled to selectively form another cross-sectional layer. As such, the intermediate combustor component article 1450 is positioned in a bed of build material 1470 as the successive layers are formed such that the unfused and fused material supports subsequent layers. This process is continued according to the modeled design as successive cross-sectional layers are formed into the completed desired portion.

The delivery of build material 1470 and movement of the intermediate combustor component article 1450 in the vertical direction are relatively constant and only the movement of the laser beam 1462 must be selectively controlled to provide a simpler and more precise implementation. The localized fusing of the build material 1470 enables more precise placement of fused material to reduce or eliminate the occurrence of over-deposition of material and excessive energy or heat, which may otherwise result in cracking or distortion. The unused and unfused build material 1470 may be reused, thereby further reducing scrap.

Any suitable laser and laser parameters may be used, including considerations with respect to power, laser beam spot size, and scanning velocity. As a general matter, the build material 1470 may be formed by any suitable powder, including powdered metals, such as a stainless steel powder, and alloys and super alloy materials, such as nickel-based or cobalt superalloys. In one exemplary embodiment, the build material 1470 is a high temperature nickel base super alloy such as IN625, MAR-M-247, SC180, CMSX486, HON-4A, and Alloy10. In other embodiments, IN718 or IN738 or other suitable alloys may be employed. In general, the powder build material 1470 may be selected for enhanced strength, durability, and useful life, particularly at high temperatures, although as described below, the powder build material 1470 may also be selected based on the intended function of the area being formed. Each successive layer may be, for example, between 10 µm and 200 µm, although the thickness may be selected based on any number of parameters. As noted above, the build material 1470 may be selected based on the desired properties of the portion respectively being formed. Returning to FIG. 13, at the completion of step 1320, the first portion is removed from additive manufacturing system (e.g., from the DMLF system 1400).

In step 1330, the first portion formed in step 1320 may undergo treatments. Generally, the portion treatments of step 1330 refer to intermediate processing treatments that may be suitable for the first portion but that may be unsuitable for portions formed in subsequent steps, e.g., because of the temperature or other processing requirements of the desired treatment. In step 1330, portion treatments may include, for example, solutioning, aging, annealing, quenching, peening, polishing, hot isostatic pressing (HIP), or coatings. Portion treatments of step 1330 may comprise stress relief, solutioning, high temperature aging, peening, HIP, and polishing. In other embodiments, an alternate material or fabrication method may be employed which may result in different step 1330 portion treatments for optimizing the component. One example of a post-laser fusion process of step 1330 is a HIP process in which an encapsulation layer is applied to the intermediate combustor component article and pressure and heat are applied to remove or reduce any porosity and cracks internal to or on the surface. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer. In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

If necessary, the intermediate combustor component article may be machined to the final specifications. In other embodiments, the intermediate combustor component article may undergo optional coating operations such as wear resistance, oxidation, environmental, and thermal barrier coatings. In further steps, the combustor component may be tested and installed in a combustor section of a gas turbine engine, as shown in FIG. 1.

The method 1300 has been discussed above with reference to the formation of a single combustor article, and thus, a single combustor component. In some embodiments, portions or groups of components (e.g., panels or combustors and/or full combustors) may be manufactured as noted above. Additionally, in one exemplary embodiment of the method 1300, more than one combustor article may be manufactured simultaneously. Unless otherwise noted, method 1300 in this embodiment proceeds as discussed above. In this embodiment of the method 1300, the combustor articles are formed on a common base block to provide a common orientation and a known point of reference and formed as discussed above. Successive layers can be formed for the group of combustor articles simultaneously according to a common module or design. For example, the powdered metal may be deposited across a single working plane and one or more lasers may selectively fuse the layers of each combustor article, either sequentially or simultaneously. The combustor articles may then be lowered together for the formation of the next layer. Simultaneous fabrication of a number of components may minimize cost and variability of the manufacturing process.

Although the embodiments discussed above generally refer to single-walled combustors, the effusion cooling holes discussed above may additionally be incorporated into double-walled combustors, including a double-walled combustor that utilizes impingement effusion cooling. As such, a cold wall that may form part of a combustor liner (e.g., inner liner or outer liner) may include a number of impingement cooling holes that admit impingement jets of cooling air to the hot wall. The impingement cooling holes are typically 90° to the surface of the cold wall, although other arrangements are contemplated. The hot wall includes a number of effusion cooling holes, such as the effusion cooling holes discussed above, that serve to direct a flow of cooling air through the hot wall such that a film of cooling air forms on the hot wall. In further embodiments, the effusion cooling holes discussed above may be incorporated into other combustor components, including nozzles, diffusers, dome structures, and case structures. In general, the embodiments described above may be combined to satisfy particular requirements.

Accordingly, exemplary embodiments discussed above provide combustors with improved effusion cooling holes. Such improved cooling may enhance durability and performance of the combustor components and the overall engine. In particular, the cooling holes enable cooling air to be placed as necessary or desired, including in positions remote from the inlet and/or that better align with the greater flow field.

As noted above, the combustor components may be fabricated with additive manufacturing techniques, including DMLF. Such techniques reduce costs and cycle time in the engine design, particularly in the iterative environment of engine design. Additionally, exemplary embodiments may produce combustor components capable of withstanding higher temperatures and stresses, thereby leading to further improvements in engine performance. Exemplary embodiments are applicable to both commercial and military gas turbine engines and auxiliary power units, including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   a first liner having a first side and a second side; and a second liner forming a combustion chamber with the second side of the first liner, the combustion chamber configured to receive an air-fuel mixture for combustion therein;

the first liner defining a plurality of effusion cooling holes configured to form a film of cooling air on the second side of the first liner, the plurality of effusion cooling holes including a first effusion cooling hole extending from the first side to the second side with a non-linear line of sight, wherein the first effusion cooling hole includes an inlet and a first segment extending from the inlet, the first segment and the inlet being positioned radially outward of a liner plane coincident with the first side and wherein the first segment and the inlet are formed by an outer structure and the first side of the first liner, wherein the outer structure extends radially outward from the first side and comprises a first and second axial portion, wherein the first and second axial portion are parallel to the liner plane and wherein the second axial portion is positioned radially outward of the first axial portion wherein the first effusion cooling hole further includes a second segment extending from the first segment, the second segment being positioned radially outward of the liner plane and the second segment being formed by the first side of the first liner and the outer structure, the second segment having a constant area along an entire length of the second segment, wherein the first and second segments of the first effusion cooling hole are formed by at least one tube portion extending outward from the first side.

2. The combustor of claim 1, wherein the effusion cooling hole includes an upstream portion extending at a first angle and a downstream portion extending at a second angle, the first and second angles being different.

3. The combustor of claim 2, wherein the effusion cooling hole further includes a trench extending between the downstream portion and an outlet on the second side.

4. The combustor of claim 3, wherein the trench has a curved base surface.

5. The combustor of claim 1, wherein the first effusion cooling hole includes a bell-mouth inlet.

6. The combustor of claim 1, wherein the first effusion cooling hole includes a third segment radially inward to the liner plane.

7. The combustor of claim 1, wherein the first effusion cooling hole includes first and second outlets fluidly coupled to the inlet.

8. The combustor of claim 7, wherein the first effusion cooling hole includes a main portion extending between the inlet and the first or second outlet.

9. The combustor of claim 1, wherein the first effusion cooling hole is curved.

10. The combustor of claim 9, wherein the first effusion cooling hole is curved within the liner plane.

11. The combustor of claim 1, wherein the first liner and the plurality of effusion cooling holes are formed by additive manufacturing.

12. The combustor of claim 1, wherein at least a portion of the first effusion cooling hole is parallel to the first and second side of the first liner.

13. A method for forming a combustor component, comprising the steps of:

generating a three-dimensional model of the combustor component; and forming the combustor component according to the three-dimensional model with additive manufacturing, wherein the forming step includes forming the combustor component as a first liner having a first side and a second side, the second side forming a combustion chamber with a second liner, the combustion chamber configured to receive an air-fuel mixture for combustion therein, wherein the first liner defines a plurality of effusion cooling holes configured to form a film of cooling air on the second side of the first liner, the plurality of effusion cooling holes including a first effusion cooling hole extending from the first side to the second side with a non-linear line of sight, wherein the first effusion cooling hole includes an inlet and a first segment extending from the inlet, the first segment and the inlet being positioned radially outward of a liner plane coincident with the first side and wherein the first segment and the inlet are formed by an outer structure and the first side of the first liner, wherein the outer structure extends radially outward from the first side and comprises a first and second axial portion, wherein the first and second axial portion are parallel to the liner plane and wherein the second axial portion is positioned radially outward of the first axial portion wherein the first effusion cooling hole further includes a second segment extending from the first segment, the second segment being positioned radially outward of the liner plane and the second segment being formed by the first side of the first liner and the outer structure, the second segment having a constant area along an entire length of the second segment, wherein the first and second segments of the first effusion cooling hole are formed by at least one tube portion extending outward from the first side.

* * * * *